United States Patent
Shimoyama

(10) Patent No.: US 7,899,212 B2
(45) Date of Patent: Mar. 1, 2011

(54) IMAGE PROCESSING APPARATUS AND IMAGE PROCESSING METHOD

(75) Inventor: Kenichi Shimoyama, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 858 days.

(21) Appl. No.: 11/892,637

(22) Filed: Aug. 24, 2007

(65) Prior Publication Data

US 2008/0049978 A1    Feb. 28, 2008

(30) Foreign Application Priority Data

Aug. 25, 2006  (JP) ............................. 2006-229581

(51) Int. Cl.
  *G06K 9/00* (2006.01)
  *B60Q 1/00* (2006.01)

(52) U.S. Cl. ...................... 382/104; 340/435

(58) Field of Classification Search ............... 382/103, 382/104; 348/14.1, 148, 149, 154, 155, 208.1, 348/208.4, 208.13, 352, 407.1; 340/435, 340/436, 903, 907, 937, 986; 701/28, 96
See application file for complete search history.

(56) References Cited

U.S. PATENT DOCUMENTS 6,535,114 B1 *  3/2003  Suzuki et al. ............... 340/435
7,015,952 B2 *  3/2006  Okada ....................... 348/208.1
7,027,615 B2 *  4/2006  Chen ......................... 382/104

FOREIGN PATENT DOCUMENTS

| JP | 8-249597    | 9/1996  |
| JP | 09-226490   | 9/1997  |
| JP | 11-282999   | 10/1999 |
| JP | 2002-112252 | 4/2002  |

OTHER PUBLICATIONS

Notification of Reason for Refusal of Aug. 26, 2008 from the Japanese Patent Office for a corresponding Japanese Patent Application No. 2006-229581.
Abe, "Vehicle Movement and Control," Sankaido (1992), pp. 64-67.

* cited by examiner

*Primary Examiner*—Abolfazl Tabatabai
(74) *Attorney, Agent, or Firm*—Finnegan, Henderson, Farabow, Garrett & Dunner, L.L.P.

(57) ABSTRACT

An image processing apparatus calculates a corresponding area on input images corresponding to a focused area on a real space in which a moving object moves, generates first images by scanning the input images along a horizontal line through the corresponding area, generates two-dimensional dynamic x-t images by arranging the first images in the vertical direction in time series, extracts characteristic points on the dynamic x-t image at a time T, generates dynamic trajectory information between the characteristic point at the time T and another characteristic point at different time from the time T near the characteristic point, and determines that the characteristic point belongs to the obstacle when the dynamic trajectory information satisfies the criterion for the obstacle.

8 Claims, 9 Drawing Sheets

Dynamic Trajectory ···· Continuously On The Same Position

IMAGE PROCESSING APPARATUS AND IMAGE PROCESSING METHOD

CROSS-REFERENCE TO RELATED APPLICATIONS

This application is based upon and claims the benefit of priority from the prior Japanese Patent Application No. 2006-229581, filed on Aug. 25, 2006; the entire contents of which are incorporated herein by reference.

TECHNICAL FIELD

The present invention relates to an image processing apparatus configured to detect an obstacle which dashes into a front area of a moving object represented by vehicles such as automotive vehicles using an image of a camera mounted thereto, and to an image processing method.

BACKGROUND OF THE INVENTION

As a system for detecting an obstacle which dashes into a front area of a moving object such as a vehicle, there is a system in which a single TV camera is mounted to a vehicle to detect an obstacle from an image picked up by the TV camera.

For example, in JP-A-8-249597 incorporated by reference, the obstacle is detected by focusing on variation of the number of edge points on a road surface. In this system, it is considered that an obstacle exists when the maximum number of edge points in a preset certain area reaches a certain threshold value.

However, in the system disclosed in JP-A-8-249597, since the obstacle is detected from the number of edge points, there is a possibility that the obstacle is detected erroneously since the number of edge points increases when there is a pattern drawn on the road surface even though there is no obstacle.

BRIEF SUMMARY OF THE INVENTION

Accordingly, the invention provides an image processing apparatus configured to be affected hardly by pitching caused by the movement of a moving object and to detect an obstacle that dashes into a front area in the moving direction, and an image processing method.

According to embodiments of the invention, there is provided an image processing apparatus for detecting an obstacle existing in front of a moving object including: an image input unit configured to pick up input images of the front area of the moving object and input the input image, a corresponding position calculating unit configured to calculate a corresponding area on the input images corresponding to a focused area in a real space in which the moving object moves; an image generating unit configured to generate first images by scanning the input images along a horizontal line through the corresponding area and generate two-dimensional second images by arranging the first images in the vertical direction in time series; a characteristic extracting unit configured to extract characteristic points of a given time on the second image; a trajectory information generating unit configured to generate trajectory information between the characteristic point at the given time and another characteristic point at different time from the given time near the characteristic point on the second image, and an obstacle detecting unit configured to determine the characteristic point to belong to the obstacle when the trajectory information satisfies a criterion for the obstacle.

According to the embodiments of the invention, an obstacle dashing into a front area in the moving direction may reliably be detected.

DESCRIPTION OF THE PREFERRED EMBODIMENTS

Referring now to FIG. 1 to FIG. 11, an image processing apparatus according to an embodiment of the invention will be described.

(1) Configuration of Image Processing Apparatus

Figure 1:
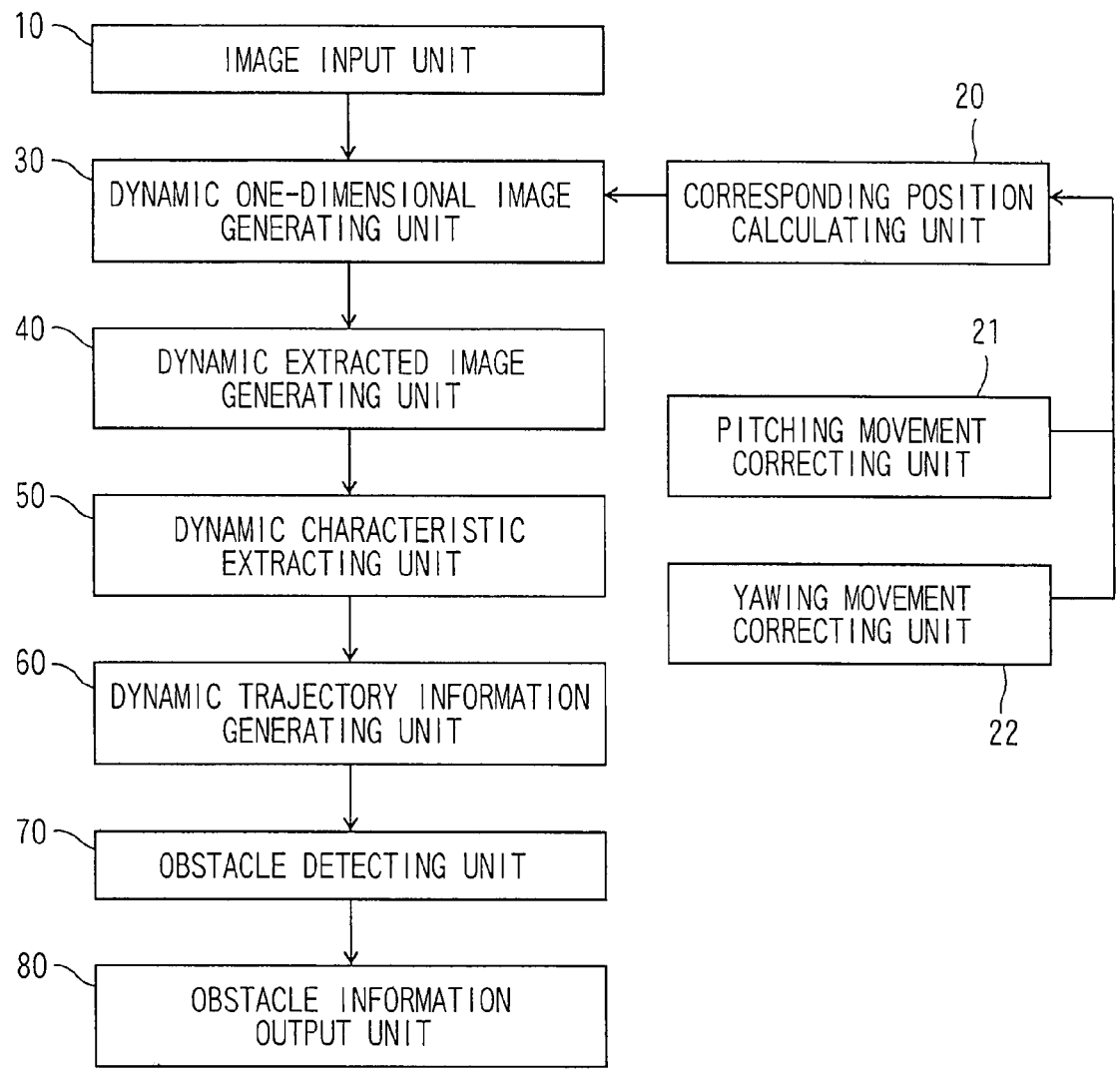
FIG. 1 is a block diagram of an image processing apparatus according to an embodiment of the invention.
Figure 2:
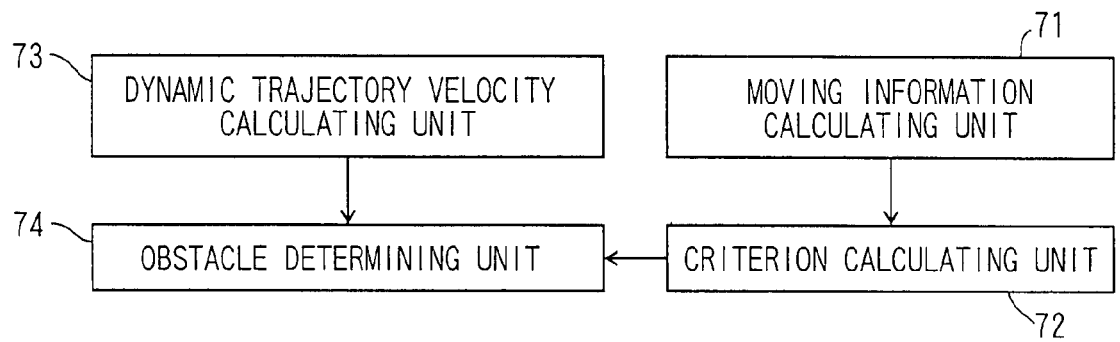
FIG. 2 is a block diagram of an obstacle detecting unit.

FIG. 1 shows an example of configuration of an image processing apparatus according to the present embodiment.

The image processing apparatus includes an image input unit 10, a corresponding position calculating unit 20, a dynamic one-dimensional image generating unit 30, a dynamic extracted image generating unit 40, a dynamic characteristic extracting unit 50, a dynamic trajectory information generating unit 60, an obstacle detecting unit 70, and an obstacle information output unit 80. The respective members 10 to 80 may be implemented by a program stored in a computer.

The image input unit 10 acquires a time-series image (x-y image) from a single TV camera mounted to a moving object of a vehicle such as an automotive vehicle.

The corresponding position calculating unit 20 calculates a certain focused area on a real space and a position corresponding to the x-y image.

The dynamic one-dimensional image generating unit 30 generates a one-dimensional (1×N) extracted images for extracting dynamic trajectory information from the x-y image.

The dynamic extracted image generating unit 40 arranges the one-dimensional extracted images generated by the dynamic one-dimensional image generating unit 30 in time series, and generates two-dimensional extracted images (hereinafter, referred to as "dynamic x-t image).

In the dynamic characteristic extracting unit 50 extracts characteristic points from the dynamic x-t image generated by the dynamic extracted image generating unit 40 for extracting stable dynamic trajectory information.

In the dynamic trajectory information generating unit 60, dynamic trajectory information is generated from the characteristic points extracted by the dynamic characteristic extracting unit 50.

In the obstacle detecting unit 70, whether or not a point or an area belonging to the x-y image whose dynamic trajectory information is extracted by the dynamic trajectory information generating unit 60 belongs to the obstruct and detects the obstruct.

In the obstacle information output unit 80, information relating the obstacle such as the distance to the detected obstacle or time until corrosion is calculated, and outputs the calculated information to a control device of a vehicle having the image processing apparatus mounted thereto and to a driver of the vehicle.

The corresponding position calculating unit 20, the dynamic one-dimensional image generating unit 30, the dynamic extracted image generating unit 40, the dynamic characteristic extracting unit 50, the dynamic trajectory information generating unit 60, the obstacle detecting unit 70, and the obstacle information output unit 80 will be described below.

In order to facilitate description, it is assumed that the TV camera is mounted in such a manner that the road surface comes to the bottom on the screen, and an optical axis extends in parallel to the road surface and in parallel to the moving direction. In this TV camera arrangement, the horizon in the screen is horizontal and corresponds to a straight line passing through the center of the image. The same manner may also be applied to other manners of installation.

(2) Corresponding Position Calculating Unit 20

Referring now to FIG. 1, the corresponding position calculating unit 20 will be described.

In the corresponding position calculating unit 20, a position of the certain focused area on the rear space and the position corresponding to the x-y image will be calculated.

For example, a position (xo, yo) on the x-y image corresponding to position (Xo, Yo, Zo) in the real space may be calculated easily from a known geometric positional relation between the TV camera and the road surface. Assuming that the TV camera is at a height of h from the road surface with the currently assumed TV camera arrangement, it is obtained from the expression;

$$(xo, yo) = (f^{*}Xo/Zo, -f^{*}(h-Yo)/Zo),$$

where f represents a focus distance of the TV camera.

In contrast, the coordinate on the real space may be obtained from the position (xo, yo) on the image, one of X, Y, and Z must be supposed.

For example, under the assumption that the position (xo, yo) on the image is Yo=0 on the road surface in the real space, it is obtained from the expression;

$$(Xo, O, Zo) = (-h^{*}xo/yo, 0, -f^{*}h/yo).$$

(2-1) Pitching Movement Correcting Unit 21

In a pitching movement correcting unit 21, an influence of a pitching movement of the vehicle generated by roughness of the road surface on the movement of the respective points on the image is removed.

Since the pitching movement of the vehicle is substantially a rotational movement about a horizontal axis of the camera, the image may be transformed by estimating the amount of rotation from the x-y image, and adjusting the amount of rotation to zero. An existing method is used as a method of estimating the rotational movement about the horizontal axis of the camera from the x-y image.

For example, in JP-2002-112252 incorporated by reference, the rotational movement about the horizontal axis is estimated from a vertical movement appeared around the horizon using the fact that the vertical movement appeared around the horizon is generated by the rotational movement about the horizontal axis of the camera. When a wide angle lens whose focal distance is short is used in the image input unit 10, the influence of the pitching movement on the image is reduced, and hence is negligible. In such a case, the system may be configured without the pitching movement correcting unit 21.

(2-2) Yawing Movement Correcting Unit 22

A yawing movement correcting unit 22 removes the influence of a yawing movement of the vehicle generated by a curving travel of the vehicle on the movement of the respective points on the image.

Since the yawing movement of the vehicle is substantially the rotational movement about a vertical axis of the camera, the image may be transformed by estimating the amount of rotation from the x-y image, and adjusting the amount of rotation to zero. There are various considerable methods of estimating the rotational movement about the vertical axis of the camera from the x-y image.

For example, JP-2002-112252, the influence of the yawing movement on the change of the image may be removed by estimating the rotational movement about the vertical axis from a lateral movement appeared around a vanishing point using the fact that the lateral movement appeared around the vanishing point is generated by the rotational movement about the vertical axis of the camera.

(3) Dynamic One-Dimensional Image Generating Unit 30

Figure 3:
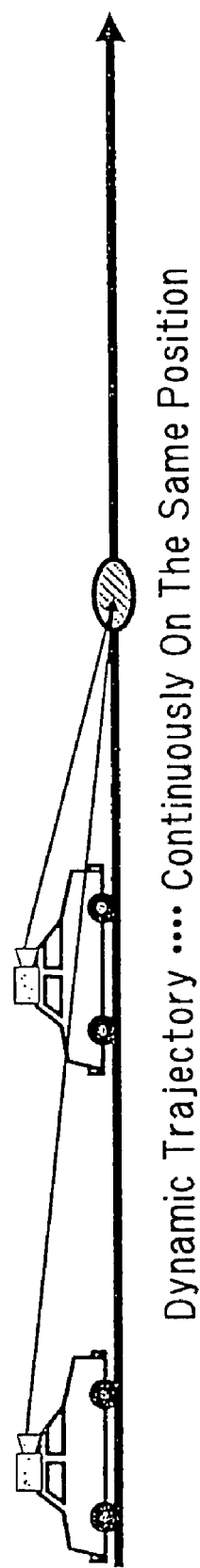
FIG. 3 is an explanatory drawing showing generation of a dynamic extracted image.
Figure 4:
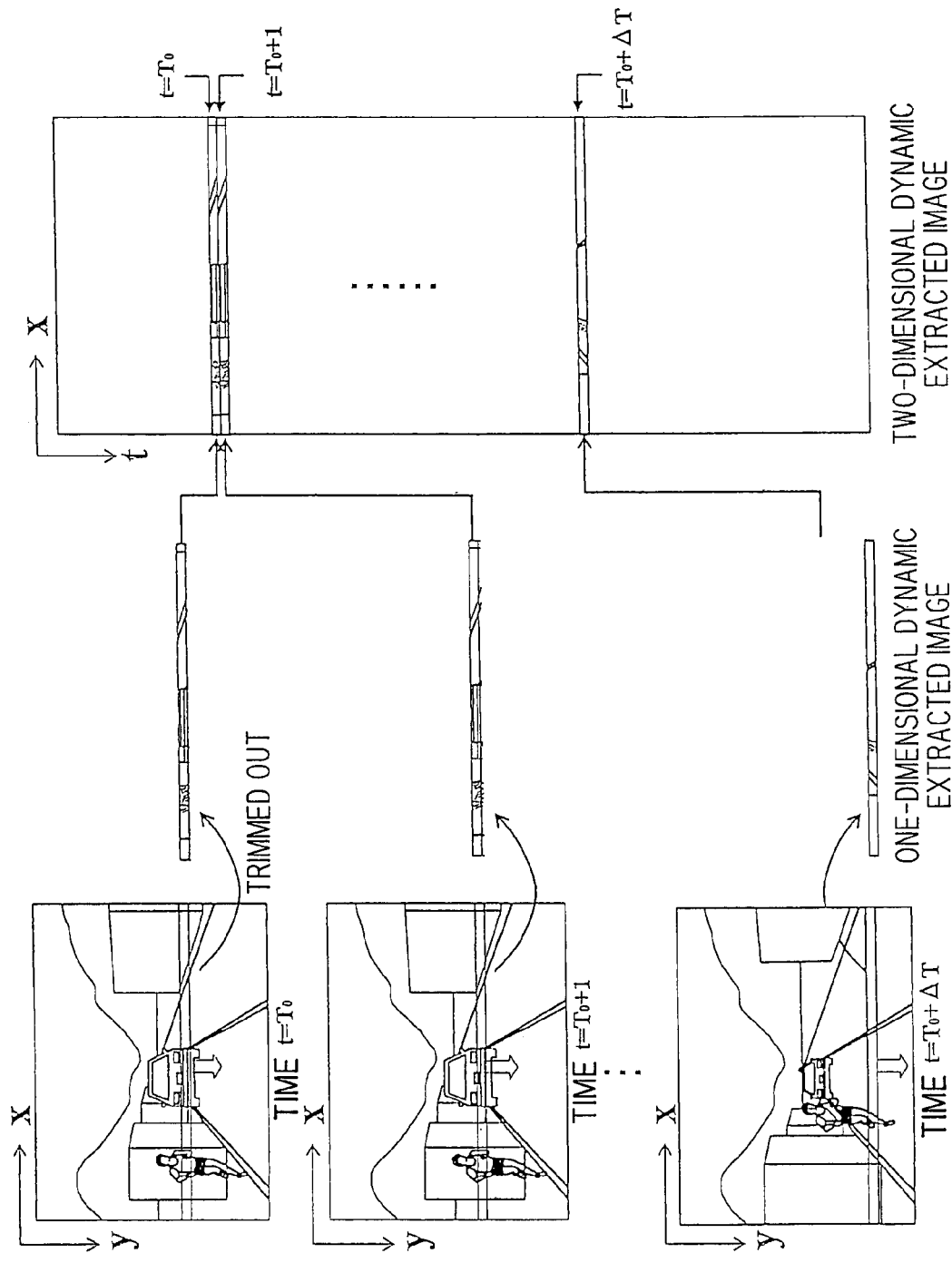
FIG. 4 is an explanatory drawing showing generation of a one-dimensional dynamic extracted image and of a two-dimensional dynamic extracted image.

Referring now to FIG. 3 and FIG. 4, the dynamic one-dimensional image generating unit 30 will be described.

The dynamic one-dimensional image generating unit 30 generates a one-dimensional (1×N) horizontally extracted images for extracting dynamic trajectory information from the x-y image.

The horizontal direction corresponds to the lateral direction on the screen, and the vertical direction corresponds to the vertical direction on the screen. The dynamic trajectory information is extracted by the generated horizontally extracted images as described below. The dynamic trajectory information is extracted by continuously focusing on a specific position on the road surface through the x-y image (see FIG. 3). The one-dimensional horizontally extracted images are generated in a method as described below.

Firstly, the specific position on the road surface (hereinafter referred to as "focused area") is determined. This focused area is provided with a corresponding area P which corresponds to a point in the real space of a 1×N image of the x-y image having the y coordinate y=Y (where Y is constant) at a certain time t=T. The corresponding area P is calculated in the same manner as the corresponding position calculating unit 20.

Subsequently, from the time T on, the change of the relative position between the vehicle on which the apparatus according to the embodiment of the invention is mounted (hereinafter referred to as "vehicle in question") and the corresponding area P is obtained by a moving information calculating unit 71, and a position Y' on the x-y image of the corresponding area P is calculated by the same method as in the corresponding position calculating unit 20, and the 1×N image having the y coordinate y=Y' is trimmed out from the x-y image, which corresponds to the one-dimensional horizontally extracted image (see FIG. 4).

The one-dimensional horizontally extracted images are generated in the method described here. At this time, the entire x-y image may be included by providing a plurality of (for example, "S") certain specific positions (that is, Ys are provided by the number of S) on the road surface as the focused area.

(4) Dynamic Extracted Image Generating Unit 40

In the dynamic extracted image generating unit 40, as shown in FIG. 4, the one-dimensional horizontally extracted images generated by the dynamic one-dimensional image generating unit 30 are arranged vertically in time series, and the dynamic x-t images are generated as two-dimensional extracted images.

At this time, the dynamic x-t images are generated by the number of the focused positions on the road surface provided by the dynamic one-dimensional image generating unit 30 (in the example shown above, "S"). The dynamic trajectory information is extracted through the procedures in the dynamic characteristic extracting unit 50 and the dynamic trajectory information generating unit 60 respectively for the S dynamic x-t images generated in this manner.

(5) Dynamic Characteristic Extracting Unit 50

In the dynamic characteristic extracting unit 50, in order to extract stable dynamic trajectory information, characteristic points are extracted from the dynamic x-t images generated by the dynamic extracted image generating unit 40 and the dynamic trajectory information is obtained for the characteristic points or characteristic areas extracted by the dynamic trajectory information generating unit 60. The term "characteristic point" represents a point having a luminance distribution in the vicinity thereof different from the peripheral luminance distribution. There are various setting methods for extracting the characteristic points.

For example, there are methods as shown below.

A first method is a method of applying differential or the like to the dynamic x-t image in the lateral direction to detect edges in the vertical direction. Then, coordinates of the detected edges in the vertical direction are determined as the characteristic points.

A second method is a method of applying Sobel filter or the like to the dynamic x-t image to detect corner points. Then, coordinates of the detected corner points are determined as the characteristic points.

A third method is a method of applying differential or the like to the one-dimensional horizontally extracted image in the lateral direction to detect edges in the vertical direction. Then, coordinates of the detected edges in the vertical direction are determined as the characteristic points.

(6) Dynamic Trajectory Information Generating Unit 60

In the dynamic trajectory information generating unit 60, the dynamic trajectory information is generated from the characteristic points extracted by the dynamic characteristic extracting unit 50.

Figure 5:
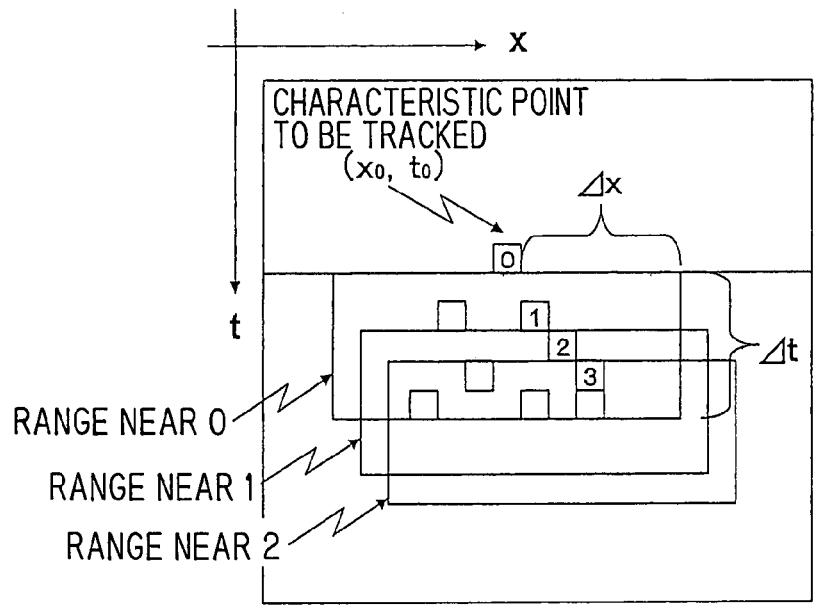
FIG. 5 is an explanatory drawing of a method of tracking trajectory information of a characteristic point.

Referring now to FIG. 5, tracking of a certain characteristic point will be described.

Firstly, the nearest characteristic point from among the characteristic points existing in the vicinity of a characteristic point (x0, t0) to be tracked is determined as the characteristic point to be tracked after having moved.

Then, a subsequent destination of the moved characteristic point is also tracked.

This operation is repeated until preset conditions (elapse of a certain time or disappearance of the characteristic point) are satisfied, so that the dynamic trajectory information is tracked.

In the case of FIG. 5, it is seen that a characteristic point 0 is moved to a characteristic point 1, a characteristic point 2, .... The term "points existing in the vicinity" means a point being at a later time within a preset time ($\Delta t$) from the focused point and existing within a range ($\Delta x$) in which the displacement of the x coordinate is set. That is, the point in the vicinity of the point (x0, t0) is a point existing within a range of;

$$x0 - \Delta x < x < x0 + \Delta x$$

$$t0 < t < t0 + \Delta t.$$

(7) Obstacle Detecting Unit 70

(7-1) First Method

Subsequently, a detailed example of configuration of the obstacle detecting unit 70 will be described.

In the obstacle detecting unit 70, the obstacle is detected by determining whether or not a point or an area belonging to the x-y image whose dynamic trajectory information is generated by the dynamic trajectory information generating unit 60 belongs to the obstacle. The determination is performed in such a manner that an object is considered to belong to the obstacle when it extends toward the center of the dynamic x-t image in the lateral direction (x-axis direction) or in parallel to the vertical direction (t-axis direction) of the dynamic x-t image.

For example, it is determined that the object belongs to the obstacle when the velocity of the dynamic trajectory veolocity calculated by a dynamic trajectory velocity calculating unit 73 satisfies a criterion calculated by a criterion calculating unit 72.

Figure 6:
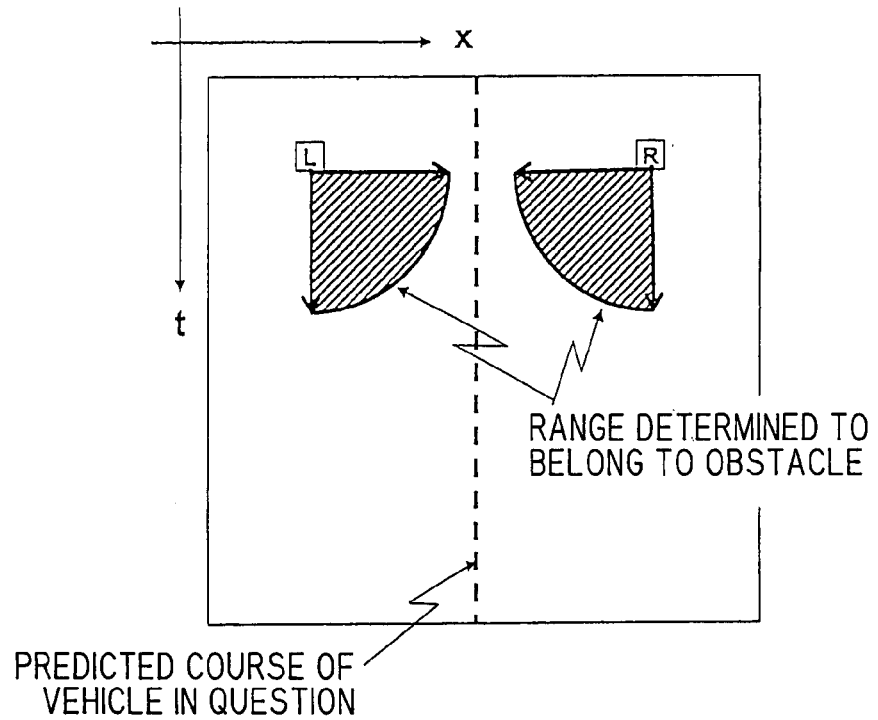
FIG. 6 is an explanatory drawing showing a method of calculating a criterion.
Figure 7:
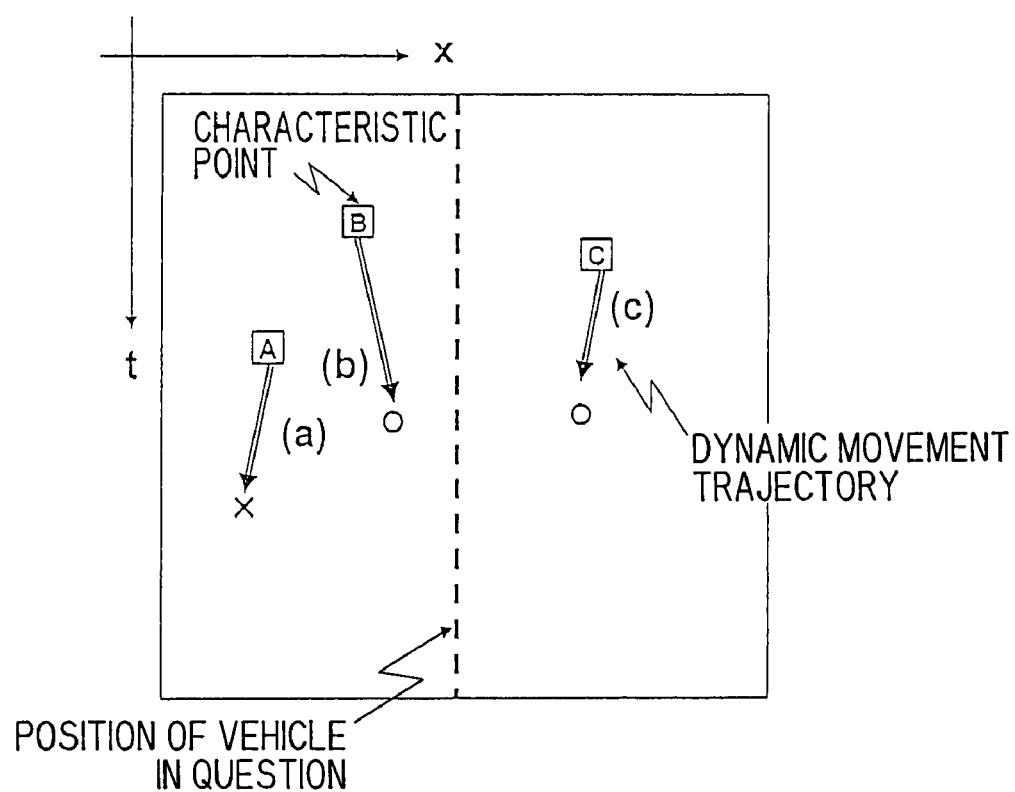
FIG. 7 is an explanatory drawing showing a method of determining trajectory information belonging to an obstacle.

It is assumed that there are characteristic points A, B and C having trajectory information shown in FIG. 7 when the criterion calculated by the criterion calculating unit 72 is within a range shown by a hatched area in FIG. 6. In the case of this example, the characteristic points B and C satisfy the aforementioned conditions. Therefore, it is understood that the points B and C are the characteristic points belonging to the obstacle.

The procedure will be described below.

(7-2) Moving Information Calculating Unit 71

In a moving information calculating unit 71, a predicted course of the vehicle in question is calculated using various sensors such as a handle steering angle sensor, a vehicle velocity sensor, and an image mounted to the vehicle in question.

Figure 8:
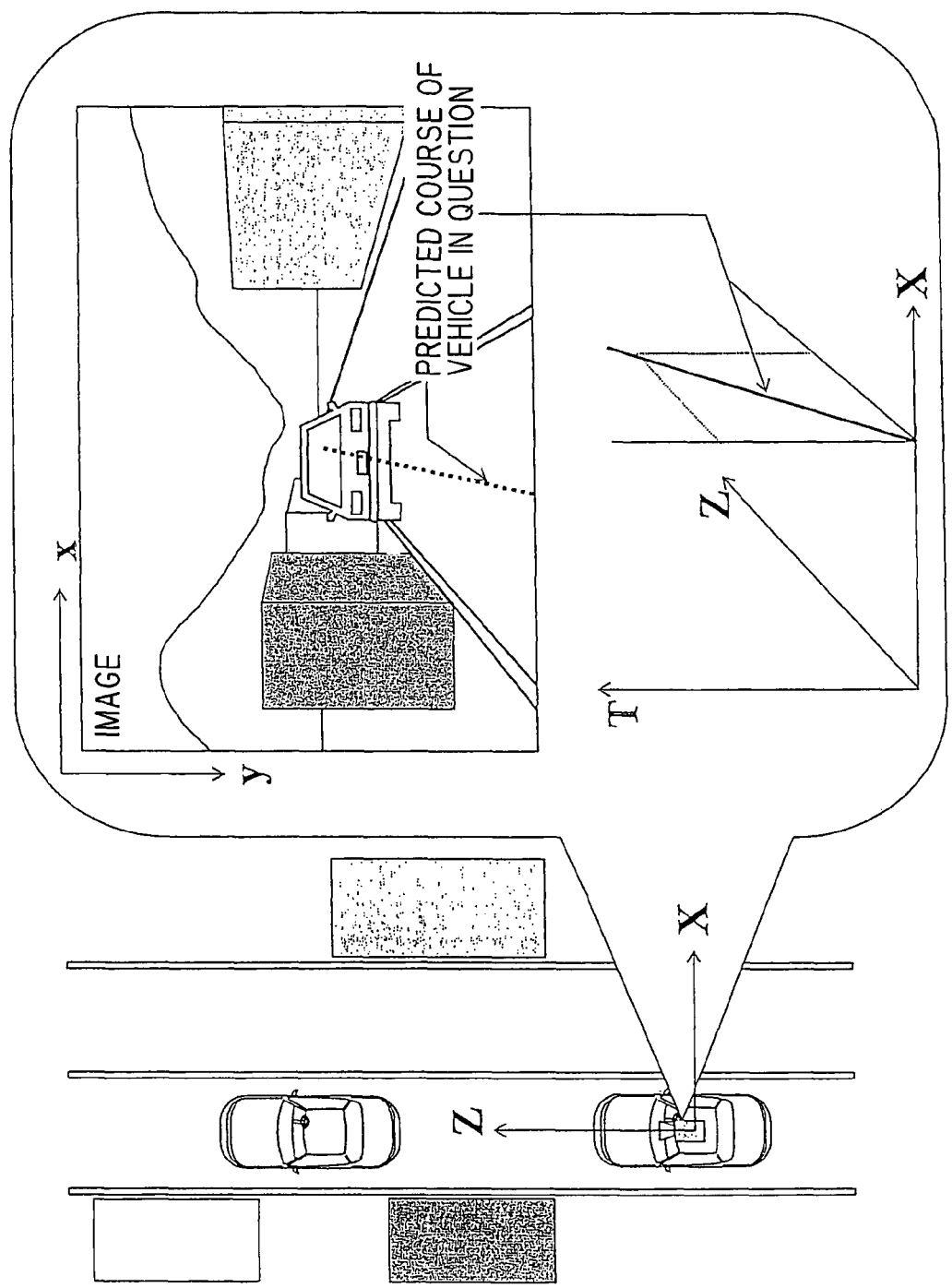
FIG. 8 is an explanatory drawing about moving information of a vehicle on which an apparatus according to the embodiment of the invention is mounted.

When expressing in XYZ coordinate system as shown in FIG. 8, the predicted course will be a curved line within a three-dimensional space of X-Z-T. With the rotational angle velocity of a wheel and the information from the various sensors such as the handle steering angle sensor and the vehicle velocity sensor, the predicted course of the vehicle may be obtained using the movement model of the vehicle (see "Vehicle Movement and Control" by Masato Abe, published by Sankaido). A predicted course on the image obtained by projecting a predicted course in the three-dimensional space of X, Z and T onto an image is calculated, and on the basis of the calculated result, the position of the vehicle in question on the dynamic x-t image is obtained.

(7-3) Criterion Calculating Unit 72

In the criterion calculating unit 72, the criterion for determining whether or not the dynamic trajectory information extracted by the dynamic trajectory velocity calculating unit 73 belongs to the obstacle is calculated from the moving information of the moving object calculated by the moving information calculating unit 71.

Figure 9:
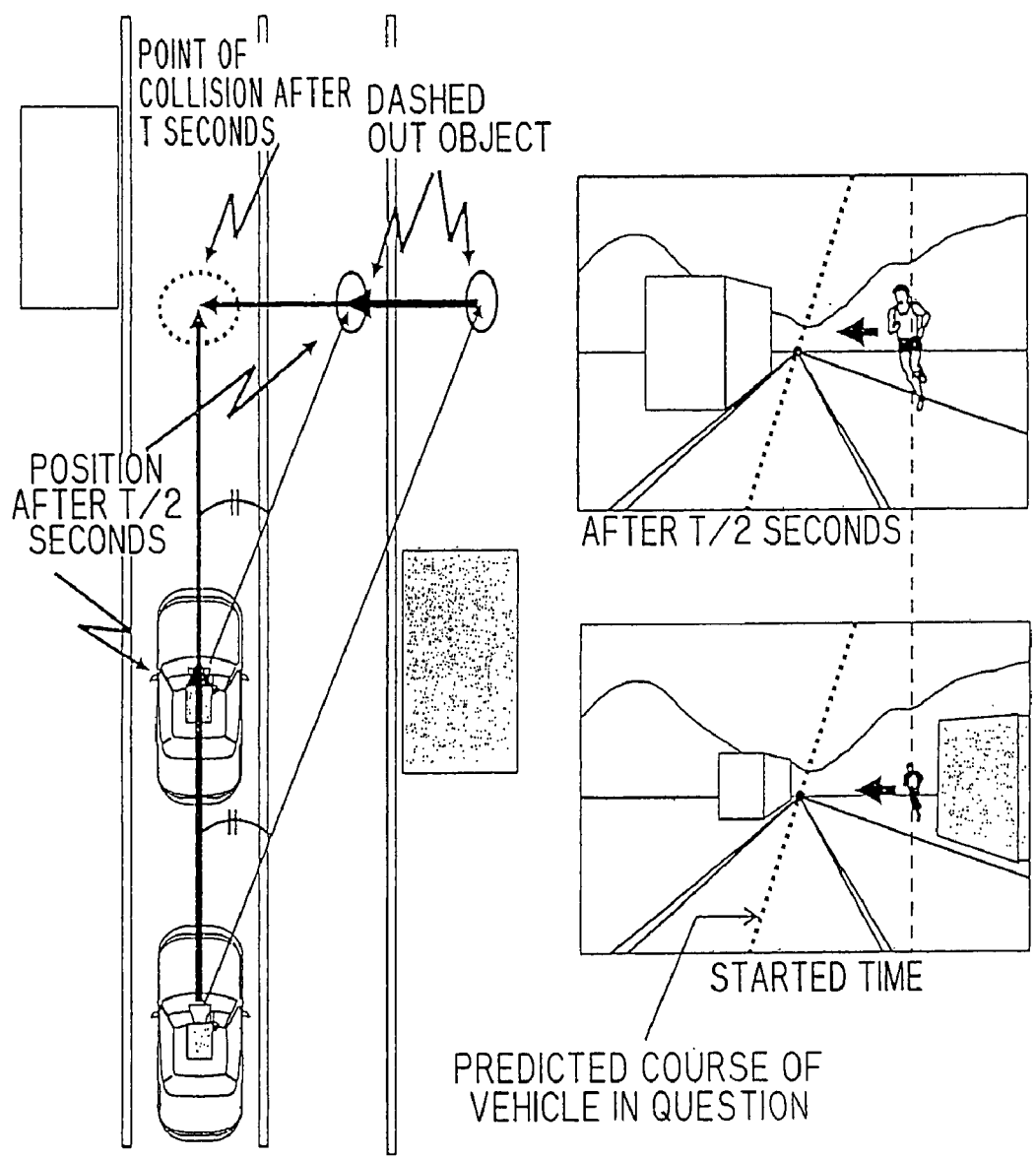
FIG. 9 is an explanatory drawing showing a method of calculating the criterion.
Figure 10:
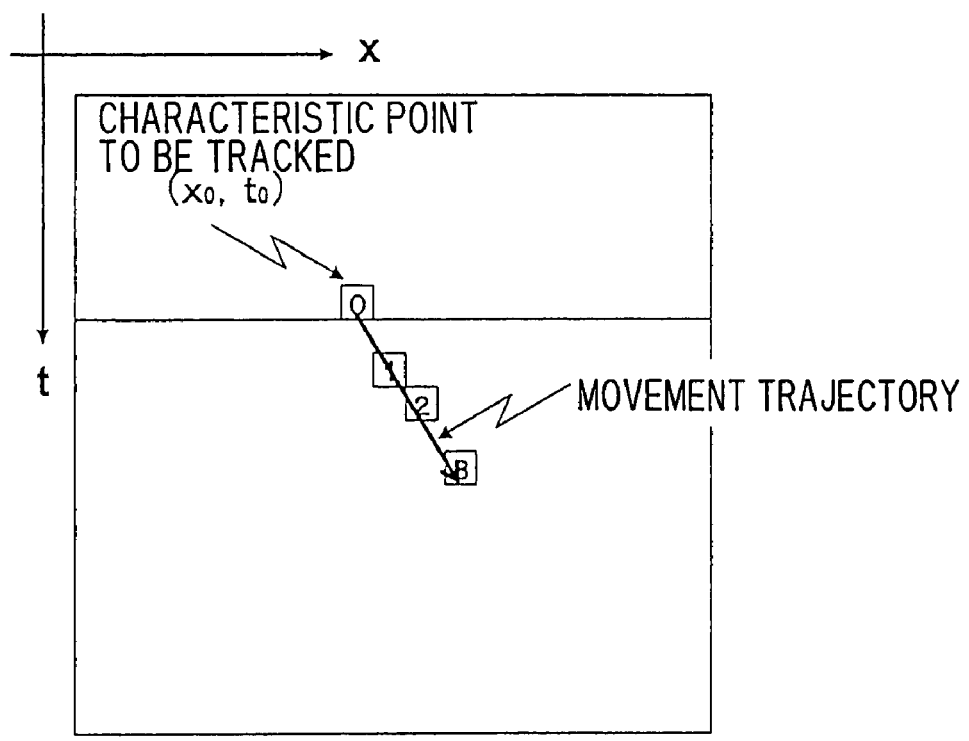
FIG. 10 is an explanatory drawing showing a method of calculating a velocity of movement of the characteristic point.

As shown in FIG. 9, the movement in the x-axis direction of an object which is a candidate of the obstacle on the x-y image is standstill or moving along a predicted trajectory of the vehicle in question calculated by the moving information calculating unit 71 or toward the direction of extension thereof. This is expressed in the dynamic x-t image as follows.

The predicted trajectory of the vehicle in question or the extension thereof is expressed as a function x=g(t) in the dynamic x-t image. The movement of the object which collides will be as follows from a curved line of g(t).

When the dynamic trajectory information is x<=g(t), a trajectory velocity Va is 0 or larger.

When the dynamic trajectory information is x>g(t), the trajectory velocity Va is expressed as 0 or lower, which is a criterion. When it is shown in the drawing, it will be expressed as the hatched areas in FIG. 6.

(7-4) Dynamic Trajectory Velocity Calculating Unit 73

In the dynamic trajectory velocity calculating unit 73, a dynamic trajectory velocity of the characteristic point on the x-y image is calculated from the dynamic trajectory information of the characteristic point obtained by the dynamic trajectory information generating unit 60. In order to obtain the dynamic trajectory velocity, an approximate straight line relating the dynamic trajectory information (characteristic point group) is calculated. An existing method such as a least square method is used as a method of calculating the approximate straight line. The inclination of the straight line obtained in this manner corresponds to the dynamic trajectory velocity. The inclination defined here is as follows. When it is considered that the approximate straight line is on the two-dimensional plane (lateral axis x, vertical axis t) at a time t=0, x=0 as an original point of the dynamic x-t image, it is expressed as;

$$x=c*t+d \ (c, d \text{ are constants}).$$

At this time, a coefficient c of t is defined as the inclination. In the case of an example shown in FIG. 10, the inclination of a straight line shown by a solid line (extending from a time at the terminal of the vector toward the time in future) corresponds to the dynamic trajectory velocity.

(8) Obstacle Information Output Unit 80

The obstacle information output unit 80 calculates the positional information of the obstacle, the velocity information and the time until the collision with the vehicle in question detected by the obstacle detecting unit 70 and outputs the calculated results. Firstly, points or areas which belong to the obstacles detected by the obstacle detecting unit 70 are divided into groups each containing the points or the areas which seem to belong to the same obstacle. Although there are various methods in grouping, an example using the x-y image will be described in this embodiment.

A curved line (edge curve) showing an edge of the x-y image is extracted. The edge curve is extracted as shown below.

When there exists an edge (pixels B) also in pixels (pixels existing in the peripheral eight directions thereof) around a certain edge (pixel A), it is determined that these pixels belong to the same edge curve.

Whether or not there are edges in the periphery is also inspected about the pixels (pixels B) having edge information which is newly added.

A curved line generated by repeating the procedures shown above is referred to as the "edge curve".

Figure 11:
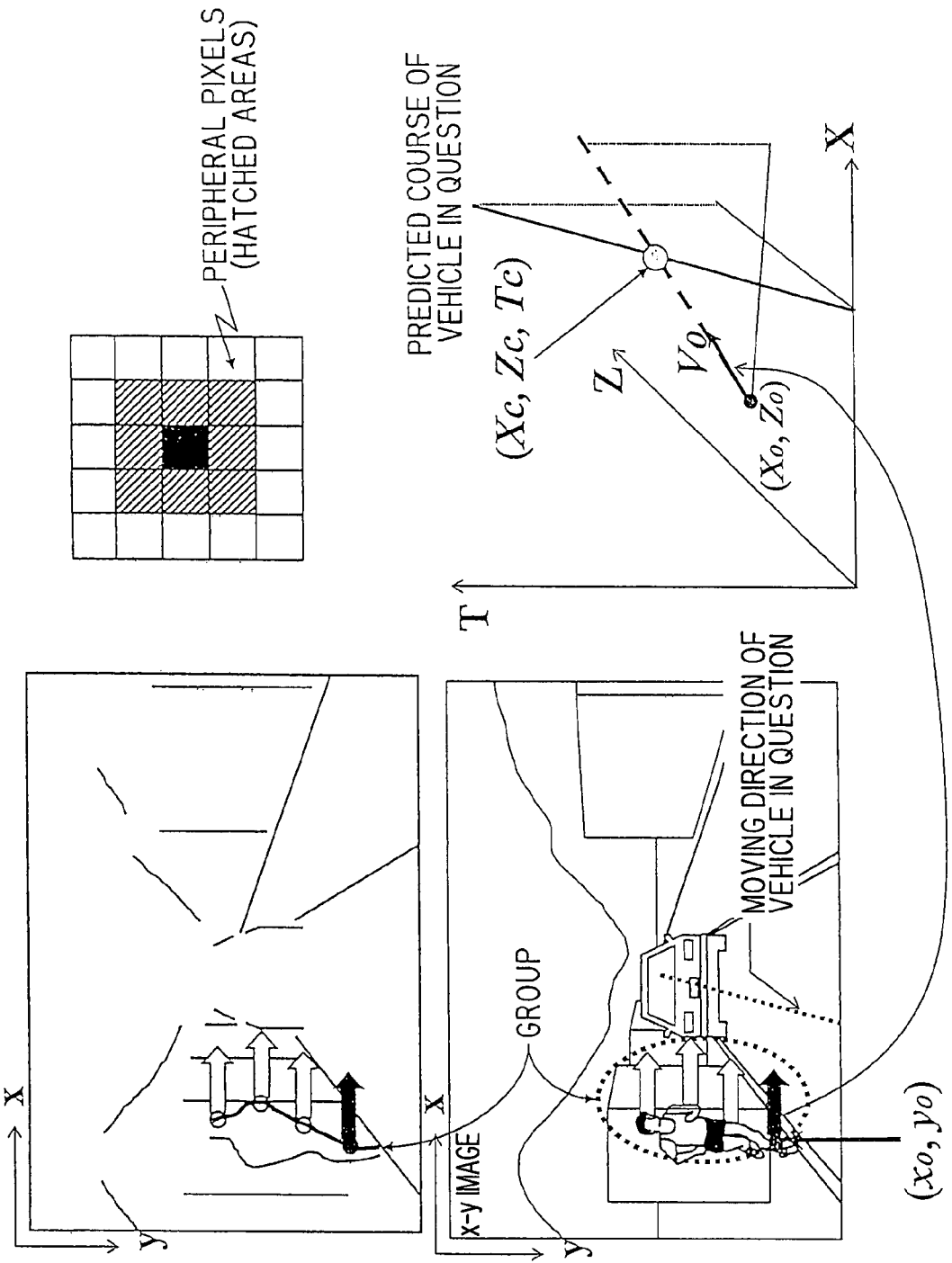
FIG. 11 is an explanatory drawing about a method of calculating obstacle information.

Subsequently, the edge curve in which the points and areas which belong to the obstacle detected by the obstacle detecting unit 70 exist is extracted. At this time, as shown in FIG. 11, the points and the areas belonging to the obstacle detected by the obstacle detecting unit 70 existing on the same edge curve are determined to belong to the same obstacle and are grouped.

The position of the point or the area on the image which is the closest to the lower end of the image from among the points or the areas which belong to the same group is determined as a position at which the obstacle is in contact with the road surface.

When the position where the obstacle is in contact with the ground (xo, yo) on the image is known, the position of the obstacle on the road surface (Xo, Zo) can be calculated easily from the known geometric positional relation between the camera and the road surface. Assuming that the camera is at the height of h from the road surface with the assumed camera arrangement, the road surface is a plane vertical to the image plane (y=-h), the following expression is established.

$$(Xo, Zo)=(-h*xo/yo, 0, -f*h/yo).$$

The velocity of the obstacle on the image is calculated using the average values, the mode values, and the median values of horizontal and vertical components of the trajectory information belonging to the respective groups. The velocity of each obstacle on the road surface Vo=(Vox, 0, Voz) is calculated easily from the velocity vo=(vox, voy) on the image and the position of the obstacle (Xo, Zo) using the known geometric positional relation between the camera and the road surface.

$$Vox=(Zo \ ô \ 2/f)(vox-voy*Xo/h)$$

$$Voz=-(voy*Zo \ ô \ 2)/(f*h)$$

The predicted course of the obstacle in the X-Z-T space may be obtained by using the velocity Vo of the obstacle on the road surface. The predicted course is obtained by assuming a uniform motion or a uniformly accelerated motion of the obstacle. By obtaining a coordinate value (Xc, Yc, Tc) at which the predicted course meets the predicted course of the vehicle in question in FIG. 8, a result indicating that collision occurs at a position (Xc, Yc) when viewed from the vehicle in question at a time Tc is outputted.

Actually, since the predicted course of the obstacle rarely meets the predicted course of the vehicle in question, it is determined that the collision will occur at (Xc, Zc, Tc) when the predicted course of the obstacle passes near (Xc, Zc, Tc) on the predicted course of the vehicle in question.

The invention is not limited to the embodiment shown above, and may be modified variously without departing the scope of the invention.

What is claimed is:

1. An image processing apparatus for detecting an obstacle existing in front area of a moving object comprising:

an image input unit configured to pick up input images of the front area of the moving object and input the input images;

a corresponding position calculating unit configured to calculate a corresponding area on the input images corresponding to a focused area in a real space in which the moving object moves;

an image generating unit configured to generate first images by scanning the input images along a horizontal line through the corresponding area and generate two-dimensional second images by arranging the first images in the vertical direction in time series;

a characteristic extracting unit configured to extract characteristic points of a given time on the second image;

a trajectory information generating unit configured to generate trajectory information between the characteristic point at the given time and another characteristic point at different time from the given time near the characteristic point on the second image; and an obstacle detecting unit configured to determine the characteristic point to belong to the obstacle when the trajectory information satisfies a criterion for the obstacle.

2. The apparatus according to claim 1, wherein the obstacle detecting unit determines the characteristic point to belong to the obstacle when the trajectory information extends toward the center of the second image in the lateral direction or parallel in the vertical direction.

3. The apparatus according to claim 1, wherein the obstacle detecting unit comprises:

a moving information calculating unit configured to calculate a position and a moving direction of the moving object from data of a sensor attached to the moving object;

a criterion calculating unit configured to calculate the criterion from the moving direction;

a dynamic trajectory velocity calculating unit configured to calculate a dynamic trajectory velocity of the characteristic point on the second image from the trajectory information; and an obstacle determining unit configured to determine that the characteristic point belongs to the obstacle when the dynamic trajectory velocity satisfies the criterion.

4. The apparatus according to claim 3, wherein the obstacle detecting unit determines that the characteristic point belongs to the obstacle based on a horizontal component of the dynamic trajectory velocity on the second image when the movement of the characteristic point is (A) standstill, (B) toward the moving direction, or (C) toward an extension in the moving direction.

5. An image processing method for detecting an obstacle existing in front area of a moving object comprising:

picking up input images of a front area of the moving object and inputting the input image;

calculating a corresponding area on the input images corresponding to a focused area in a real space in which the moving object moves;

generating first images by scanning the input images along a the horizontal line through the corresponding area and generating a two-dimensional second image by arranging the first images in the vertical direction in time series;

extracting characteristic points of a given time on the second image;

generating trajectory information between the characteristic point at the given time and another characteristic point at different time from the given time near the characteristic point on the second image; and determining the characteristic point to belong to the obstacle when the trajectory information satisfies a criterion for the obstacle.

6. The method according to claim 5, wherein the characteristic point is determined to belong to the obstacle when the trajectory information extends toward the center of the second image in the lateral direction or parallel in the vertical direction.

7. The method according to claim 5, wherein determining the obstacle comprises:

calculating a position and a moving direction of the moving object from data of a sensor attached to the moving object;

calculating the criterion from the moving direction;

calculating a dynamic trajectory velocity of the characteristic point on the second image from the trajectory information; and determining that the characteristic point belongs to the obstacle when the dynamic trajectory velocity satisfies the criterion.

8. The method according to claim 7, wherein the characteristic point is determined to belong to the obstacle based on a horizontal component of the dynamic trajectory velocity on the second image when the movement of the characteristic point is (A) standstill, (B) toward the moving direction, or (C) toward an extension in the moving direction.

* * * * *